United States Patent
King, Sr.

[11] Patent Number: 6,109,565
[45] Date of Patent: Aug. 29, 2000

[54] AIR CRAFT WING

[76] Inventor: Lloyd Herbert King, Sr., 400 Seasage Dr. Unit 1006, Delray Beach, Fla. 33483

[21] Appl. No.: 09/118,878

[22] Filed: Jul. 20, 1998

[51] Int. Cl.⁷ .................................................. B64C 21/04
[52] U.S. Cl. .............................................................. 244/207
[58] Field of Search ................................... 244/12.1, 200, 244/207

[56] References Cited

U.S. PATENT DOCUMENTS

| | | | |
|---|---|---|---|
| 1,810,693 | 6/1931 | Alfaro . | |
| 2,267,927 | 12/1941 | Kightlinger | 244/200 |
| 2,437,732 | 3/1948 | Ferrel | 244/207 X |
| 2,479,487 | 8/1949 | Goembel | 244/15 |
| 2,646,945 | 7/1953 | Perry | 244/40 |
| 2,873,931 | 2/1959 | Fleischmann | 244/42 |
| 3,010,680 | 11/1961 | Kaplan | 244/42 |
| 3,128,063 | 4/1964 | Kaplan | 244/42 |
| 3,142,457 | 7/1964 | Quenzler | 244/42 |
| 3,317,162 | 5/1967 | Grant | 244/42 |
| 3,326,500 | 6/1967 | Lanier | 244/42 |
| 3,840,199 | 10/1974 | Tibbs | 244/40 R |
| 3,887,146 | 6/1975 | Bright | 244/12 R |
| 3,915,412 | 10/1975 | Tibbs | 244/42 CC |
| 3,974,987 | 8/1976 | Shorr | 244/207 |
| 4,674,716 | 6/1987 | Moore | 244/207 |
| 5,255,881 | 10/1993 | Rao | 244/207 X |

*Primary Examiner*—Robert P. Swiatek

[57] ABSTRACT

An aircraft having a wing with a top surface and a bottom surface, with the top surface having a first plurality of jets containing flow straighteners integrally hinged to the skin of the aircraft and positioned to direct air rearwardly along the top surface of the wing and the bottom surface having a second plurality of jets containing flow straighteners integrally hinged to the skin of the aircraft and positioned for directing air forwardly along the bottom surface of the wing and a compressor for receiving outside air and pressurizing the air which is then directed rearwardly along the top of the wing to decrease the pressure on top of the wing and forwardly along the bottom surface of the wing to increase the pressure on the bottom of the wing to increase the lift of the wing and thereby increase the lift and permit the aircraft to takeoff and land at a ground speed slower than if the pressurized air was not directed over the wing.

7 Claims, 4 Drawing Sheets

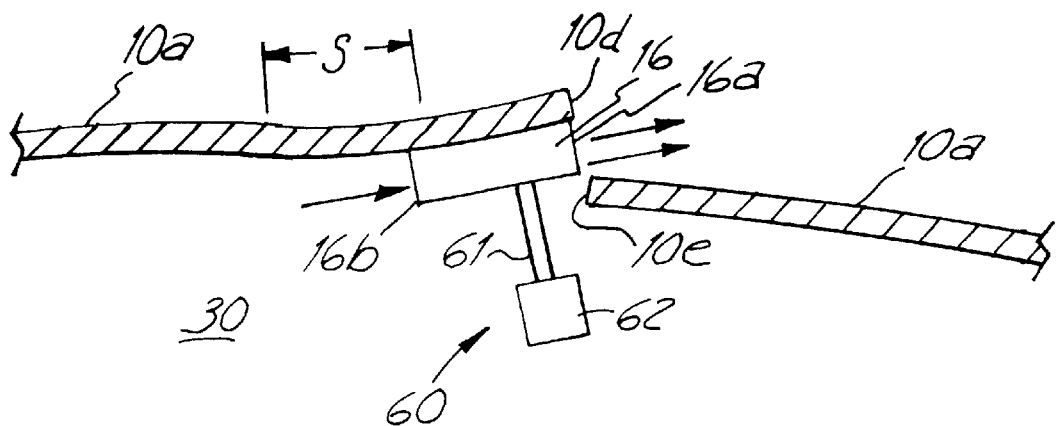
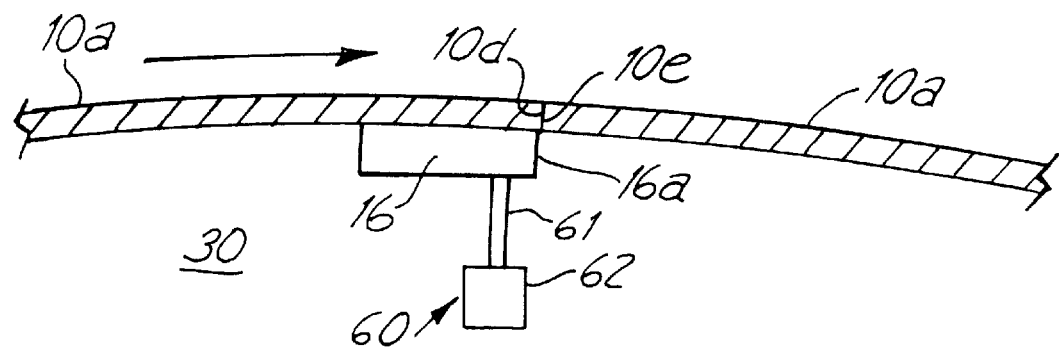

AIR CRAFT WING

FIELD OF THE INVENTION

This invention relates generally to aircraft wings and, more specifically, to an aircraft wing having integrally hinged flow jets to improve lift during takeoff or landing and to also present a conventional airfoil surface during normal flight.

BACKGROUND OF THE INVENTION

The concept of injecting pressurized air into the boundary layer of an aircraft wing is known in the art. In one method, the lift of a hollow airfoil is increased by directing hot air from the engine to the top front portion of the air foil while at the same time sucking air into the trailing top edge of the wing. However, the methods to achieve the injection of air into the boundary layer are cumbersome or involve structures that disrupt the flow over the wing during normal flight.

A device for injecting air is shown in U.S. Pat. No. 2,873,931, which includes an airplane wing with nozzles on both the upper and the lower surfaces of the aircraft wing. Air from a source, such as the means to propel the aircraft, is supplied to nozzles which inject the air rearwardly along the top of the wing and rearwardly along the bottom of the wing to increase the lift. The plane includes adjustable wing sections to enable the pilot to direct the nozzles in various directions in order to provide steering control of the plane. For example, the patent suggests the nozzles can be used to decrease the turning radius by extending the nozzles in the forward direction on one wing and in the aft direction in the other wing. The patent also points out that if only the top nozzles are directed in a forward direction, it aids in nosing the plane down and if only the bottom nozzles are directed forward it will divert air over the top of the wing and increase the effective lift. The art points out that if both the upper and lower nozzles are simultaneously directed in a forward direction, it produces a braking effect to reduce the speed of the plane.

In contrast to directing air rearwardly over both the top and bottom of the wing of the aircraft, the present invention includes integrally hinged nozzles that direct the air in opposite directions over the top and bottom of the aircraft wing. The present invention provides an assist for takeoff and landing by temporarily increasing the lift of the wing by simultaneously directing pressurized air rearwardly across the top of the wing through a first plurality of rows of flow straightener jets that are located on the top of the wing and integrally hinged to the skin of the aircraft so that flexing of the upper aircraft skin can open or close the jets, and a second plurality of rows of flow straightener jets that are located on the bottom of the wing and integrally hinged to the skin of the aircraft so that flexing of the lower aircraft skin can open or close the jets. The simultaneous operation of the first jets and the second jets in opposite directions on opposite sides of the wing, has the effect of increasing the pressure on the underside of the wing and decreasing the pressure on the top side of the wing to thereby increase the lift so that the aircraft can take off and land at slower speeds. The use of the skin as an integral hinge permits the jets to be retracted to a condition where the exterior of the aircraft presents a normal smooth surface for air to flow over during normal flight.

DESCRIPTION OF THE PRIOR ART

U.S. Pat. No. 1,810,693 discloses an airplane wing and points out that in a wind tunnel test it is difficult to obtain a sufficient amount of compressed air to improve the lift. The patent proposes to increase the lift of a hollow airfoil by obtaining hot air from the engine and directing it to the front portion of the top of the air foil while at the same time sucking air into the trailing top edge of the wing.

U.S. Pat. No. 2,873,931 discloses an airplane with boundary layer control with nozzles on both the upper and the lower surfaces of the wing. Air from a source such as the means to propel the craft is supplied to nozzles and then injected rearwardly along the top of the wing to increase the lift. The plane includes adjustable wing sections to direct the nozzles in various directions and suggests that to increase the turning ability of the plane, one wing may extend the nozzles in the forward direction and the other may extend the nozzles in the aft direction. The patent also points out that if only the top nozzles are directed in a forward direction, it aids in nosing the plane down, and if only the bottom nozzles are directed forward, it will divert air over the top of the wing and increase the effective lift, while if both the upper and lower nozzles are simultaneously directed forward, it produces a braking effect to reduce the speed of the plane.

U.S. Pat. No. 2,646,945 discloses an airplane wing structure with a funnel shape passageway that directs air from the top of the wing to a reduced opening in the bottom of the wing. The inventor states that a high degree of efficiency is obtained in transferring the air from the upper surface of the wing to lower surface of the wing which increase the lift efficiency of the wing.

U.S. Pat. No. 3,326,500 discloses an aircraft lift-increasing device with a deflector and at least one passage to direct air from the lower side of the airfoil to the upper side of the airfoil.

U.S. Pat. No. 2,479,487 disclose an airplane with wing discharge slots located in the trailing edge of the wing which the inventor states effectively eliminates the trailing edge section of the airfoil which he states is less effective than the forward portion of the airfoil.

U.S. Pat. No. 3,010,680 discloses an airfoil with boundary layer control that introduces pressurized fluid into the boundary layer on the top portion of the wing.

U.S. Pat. No. 3,128,063 is a divisional application of U.S. Pat. No. 3,010,680.

U.S. Pat. No. 3,142,457 discloses a stall pattern control that uses super circulation or boundary layer control to increase the lift and decrease drag of the wing by having nozzles that direct air rearwardly over the flaps of the wing.

U.S. Pat. No. 3,317,162 discloses an aircraft wing where suction is produced at the rearwardly portion of the wing to increase the airflow through the wing. The wing also includes an opening in the front portion of the wing to scoop air into the wing.

U.S. Pat. No. 3,887,146 discloses an aircraft that has inflatable gas storage compartments to aid in directing air over the wings to increase the lift of the airfoil.

U.S. Pat. No. 3,840,199 discloses an airfoil with a plurality of openings in the upper portion of the airfoil to direct an airflow over the entire surface of the wing to create lift forces sufficient to lift the wing.

U.S. Pat. No. 3,915,412 is a division of U.S. Pat. No. 3,840,199.

U.S. Pat. No. 4,674,716 discloses a crescent shaped airfoil over which air is blown to create a Coanda effect to increase the lift of the airplane.

SUMMARY OF THE INVENTION

Briefly, the present invention comprises an aircraft having a wing with a top surface and a bottom surface, with the top surface having a portion of the skin supporting a first plurality of jets containing flow straighteners to direct air rearwardly along the wing with the skin forming an integral one-piece hinge for retracting or extending the jets, and a bottom surface having a second plurality of jets containing flow straighteners to direct air forward along the wing with the skin forming an integral one-piece hinge for retracting or extending the jets and a compressor for receiving outside air to thereby generate pressurized air which during takeoff and landing is directed into a plenum chamber to be directed rearwardly along the top surface of the wing to decrease the pressure on top of the wing and forward along the bottom surface of the wing to increase the pressure on the bottom of the wing to thereby increase the lift of the wing to permit the aircraft to takeoff and land at a ground speed slower than if the pressurized air was not directed over the surfaces of the wing.

BRIEF DESCRIPTION OF THE DRAWINGS

FIG. 2 is an enlarged portion of the aircraft wing showing an integral hinged jet in an extended condition;

FIG. 3 is an enlarged portion of the aircraft wing showing the integral hinged jet of FIG. 2 in the retracted condition for normal flow;

DESCRIPTION OF THE PREFERRED EMBODIMENT

Figure 1:
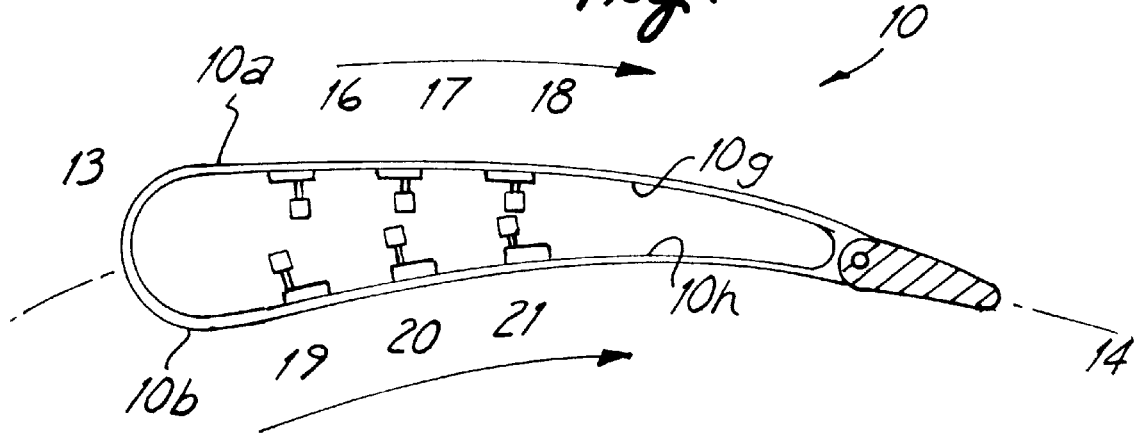
FIG. 1 is a cross-sectional view of a wing showing air jets located on the top side and the bottom side of an aircraft wing, with the jets in a retracted condition for normal flight.

Referring to the drawings, FIG. 1 shows a cross-section of an aircraft wing 10 having an exterior surface formed by top surface 10a and a bottom surface 10b with the aircraft wing having a leading edge 13 and a trailing edge 12. An interior aircraft wing surface is identified by reference numerals 10g and 10h. A central axis 14 extends through the wing. A first plurality of flow straightener jets 16, 17, and 18 are located on the top side of the wing and a second plurality of flow jets 19, 20 and 21 are located on the bottom side of the wing. The jets are shown in the closed condition so that air can flow normally over the wing as indicated by the arrows.

Figure 1A:
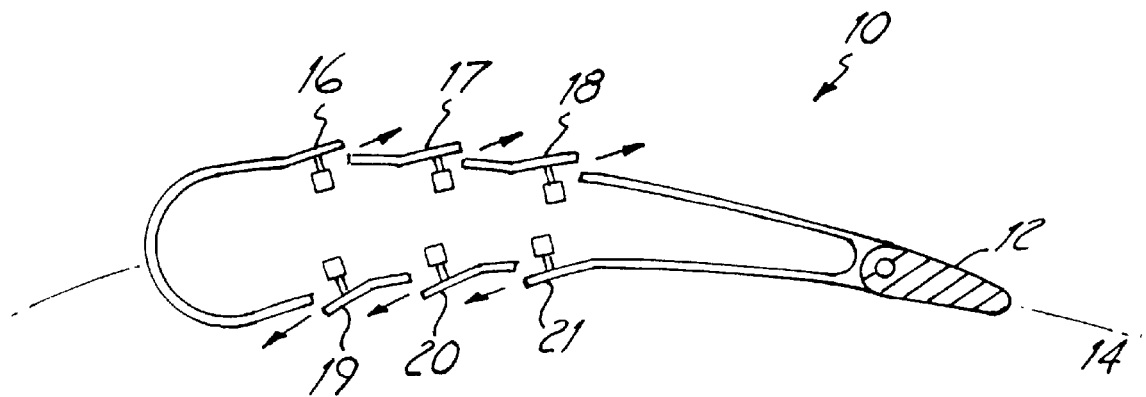
FIG. 1A is a cross-sectional view of FIG. 1 showing the jets in an extended condition for takeoff or landing.

FIG. 1A shows the first plurality of upper flow straightener jets 16, 17, and 18 directing pressurized air rearwardly along the top surface of the wing and in a direction toward the trailing edge 12, and the second plurality of lower flow jets 19, 20 and 21, which may or may not be flow straightener jets, directing air forwardly along the bottom surface of the wing toward the leading edge 13 of wing 10.

Figure 4:
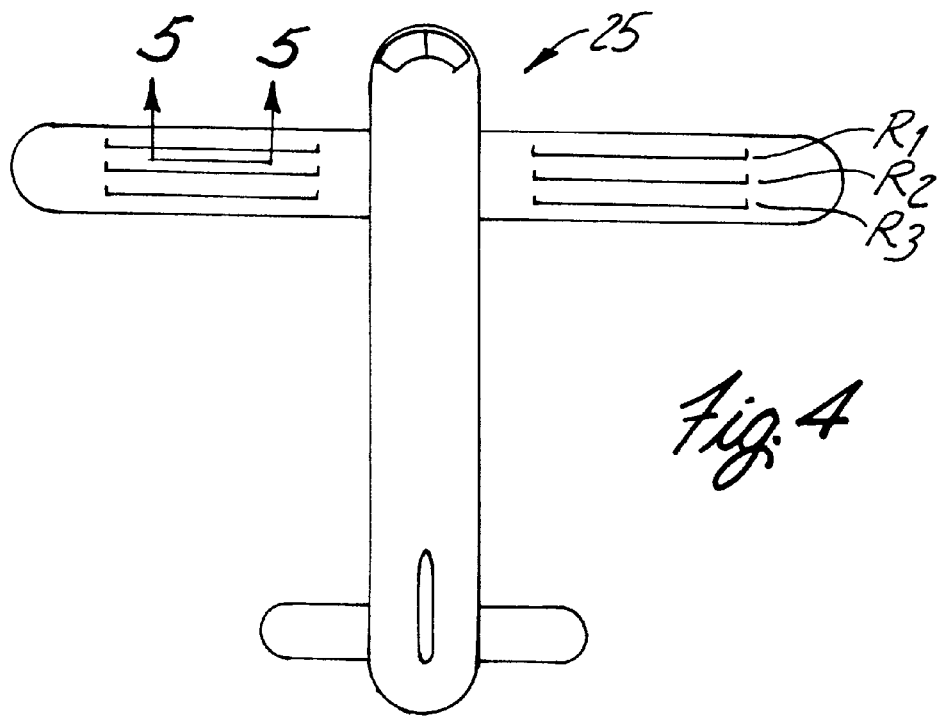
FIG. 4 is a top view of an aircraft showing the cuts in the aircraft skin to define the integral hinges which contain rows of jets located thereunder.

FIG. 4 is a top view of an aircraft 25 including the location of the U-shaped slits in the skin of the aircraft that define a rectangular shaped flap, and also define the location of a first row of flow straightener jets $R_1$, a second row of flow straightener jets $R_2$ and a third row of flow straightener jets $R_3$ which are located on both wings of the aircraft. While three rows of flow straightener jets are shown on each side, more or less rows could be used depending on the amount of lift need for a particular aircraft. Located on the underside of the wing are identical U-shaped slits that define the location of further rows of similar flow straightener jets. The purpose of the rows of jets is to provide for injection of air over a wide surface of both the top surface and the bottom surface of the wing.

To illustrate the operation of the integral hinged flow jets of the present invention, reference should be made to FIG. 2 which shows a flow straightener jet 16 positioned in the extended condition so that air can be introduced into the boundary layer to affect the lift of the wing 10. That is, the flow straightener jet 16 must deliver sufficient air so as to influence the air flowing over the wing and at the same time deliver the air into the boundary along the surface of the wing. Flow straightener jet 16 has an inlet end 16b and a discharge end 16a for discharging air with the direction of air flow indicated by arrows. A drive mechanism 60 includes a drive motor 62 mounted to the frame (not shown) of wing 10 and an extendible member 61 that can be extended or retracted to flex the skin 10a of the aircraft in or out in the area designated by "s". It is this portion of the skin of the aircraft that forms an integral hinge. Typically, the skin of the aircraft is made from a lightweight metal such as aluminum or an alloy of aluminum which allows this type of integral hinge relationship. FIG. 2 shows the member 61 extended which flexes skin 10a to force the end 16a to direct air rearwardly over skin 10a located on the downstream side. That is, skin 10a has end 10d which is displaced upward from end 10e of skin 10a by a sufficient amount so that the flow straightener jet 16 can direct air rearwardly over the wing. A plenum chamber 30 is located in the wing section to provide air to the flow straightener jet.

FIG. 3 shows the flow straightener jet 16 of FIG. 2 in the closed condition for normal air flow over wing 10. As the other flow straightener jets are identical only flow straightener jet 16 will be described herein. In this condition, flow straightener 16, which is secured directly to the underside of skin 10a has been retracted by drive mechanism 60 so that end 16a is within chamber 30 and end 10d is in a mating engagement with end 10e. Thus, it can be appreciated that the hinge which allows retraction and extension of the flow jet is integral with the skin of the aircraft and when in the contracted condition presents a smooth surface to the flow of air thereover. While the jet 16 is shown in the fully open position in FIG. 2 and the fully closed position in FIG. 3, one can extend the jets only partially so that portion of the flow jet end 16a is blocked by end surface 10e, thus the operator can control the amount of lift by directing the proper amount of air along the wing surface.

Figure 5:
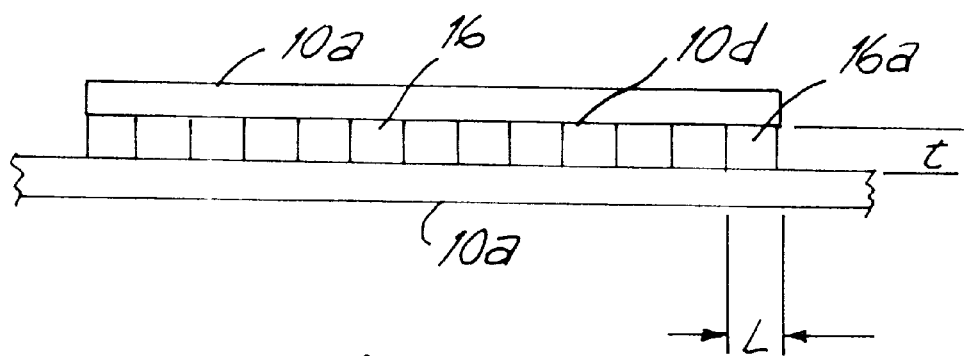
FIG. 5 is an end view of a portion of the flow straightener jets taken along lines 5—5 of FIG. 4.

FIG. 5 is an end view of the flow straightener jets 16 taken along lines 5—5 of FIG. 4 illustrating that the flow straightener jets 16 comprise a row of square shaped passage jets 16a that have a width designated by "L" and a height designated by "t" with the distance being substantially equal to provide a square outlet so that pressurized air can be delivered directly onto the surface of the wing. That is, the flow straightener jets provide parallel paths through the flow straightener to minimize turbulence effects. As can be seen from FIG. 5, the jets need to be hinged upward to allow for insertion of air into the boundary layer along the wing.

In the embodiment shown, the flow straightener jets 16, 17 and 18 connect to a top plenum chamber 30 where the pressurized air is controlled by the pilot to enable the pilot to increase or decrease the lift of the system. Similar, flow jets 19, 20 and 21 are connected to a bottom plenum chamber where the pressurized air is controlled by the pilot to enable the pilot to increase or decrease the lift of the system through the lower flow straightener jets. If desired, in certain applications only one plenum chamber need be used.

Figure 6:
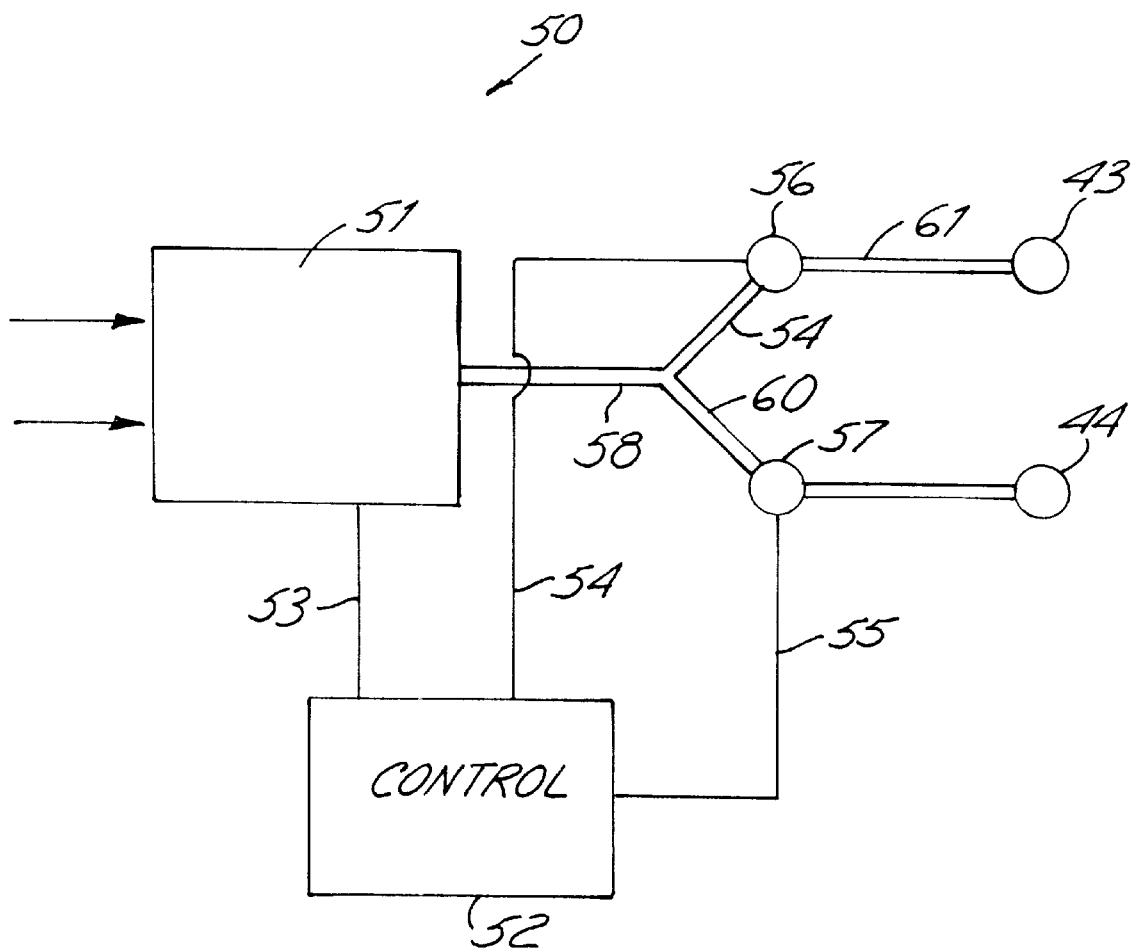
FIG. 6 shows a partial schematic of the pressurized air system for directing pressurized air through the top and bottom flow straightener jets.

FIG. 6 shows a partial schematic of the pressurized air system 50 including a compressor 51 which is controlled by a pilot or a control system 52 through control cable 53. In operation, the compressor takes incoming air, pressurizes it, and discharges the pressurized air through duct 58 and into duct 59 and 60. A first control valve 56 which is connected to control system 52 controls the amount of pressurized air directed through duct 61 and into duct 43 that supply the flow straightener jets 16, 17, and 18 on the top side of the wing 10. Similarly, a second control valve 57 which is connected to control system 52 controls the amount of pressurized air directed through duct 62 and into duct 44 that supplies the flow jets 19, 20, and 21 on the bottom side of the wing 10.

Thus, the present invention provides for increased lift by directing air in opposite directions on opposite sides of the aircraft wing.

I claim:

1. An aircraft having a wing with a topside and a bottom side with the wing having a skin with an exterior surface and an interior surface, said interior surface having a plurality of jets attached to the interior surface of the skin to direct air along the wing through flexing of the skin whereby the skin of the aircraft forms an integral hinge for extending or retraction the first plurality of jets, a compressor for receiving outside air and generating pressurized air, a set of ducts for directing the pressurized air into flow straighteners so that pressurized air is directed rearwardly along the top of the wing to decrease the pressure on top of the wing and forwardly along the bottom surface of the wing to increase the pressure on the bottom of the wing to thereby increase the lift of the wing to thereby permit said aircraft to takeoff and land at a ground speed slower than if the pressurized air was not directed over the wing.

2. The aircraft of claim 1 wherein the jets are located on the top side and the bottom side of the wing.

3. The aircraft of claim 2 wherein the jets have a square air flow passage therein.

4. The aircraft of claim 3 wherein the jets are spaced adjacent each other.

5. The aircraft of claim 4 wherein the top of the wing includes at least three rows of jets.

6. The aircraft of claim 5 wherein the compressor for pressuring the air injects the pressurized air into the wings of the aircraft.

7. The aircraft of claim 1 wherein the wing has U-shaped slots therein to define the integral hinged areas of the wing.

* * * * *